(12) United States Patent
Dorrer et al.

(10) Patent No.: US 7,068,411 B2
(45) Date of Patent: Jun. 27, 2006

(54) METHOD AND APPARATUS FOR OPTICAL SAMPLING

(75) Inventors: Christophe J Dorrer, Matawan, NJ (US); Inuk Kang, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 315 days.

(21) Appl. No.: 10/766,977

(22) Filed: Jan. 29, 2004

(65) Prior Publication Data

US 2005/0168792 A1    Aug. 4, 2005

(51) Int. Cl.
*G02F 1/03* (2006.01)
*H04B 10/04* (2006.01)

(52) U.S. Cl. .................. 359/245; 359/259; 359/264; 398/189; 398/147

(58) Field of Classification Search ............... 359/245, 359/238, 239, 259, 264; 398/147, 148, 189
See application file for complete search history.

(56) References Cited

OTHER PUBLICATIONS

A. D. Ellis et al., "Full 10=10 Gbit/s OTDM Data Generation And Demultiplexing Using Elecroabsorption Modulators", *Electronics Letters*, vol. 34, No. 18, 3rd Sep. 1998, pp. 1766-1767.

*Primary Examiner*—Timothy Thompson
(74) *Attorney, Agent, or Firm*—David A. Sasso

(57) ABSTRACT

An optical sampling method and apparatus are provided for modulating an optical signal using a first electroabsorption modulator (EAM) driven by a sinusoidal RF voltage signal to provide substantially jitter free temporal gating of the optical signal. The gated optical signal from the first EAM is routed through a second EAM to provide an optical output signal having a reduced repetition rate. The second EAM is driven using an electrical pulse train having a repetition rate that is a subharmonic of the frequency of the sinusoidal RF voltage signal driving the first EAM.

13 Claims, 4 Drawing Sheets

METHOD AND APPARATUS FOR OPTICAL SAMPLING

BACKGROUND OF THE INVENTION

1. Field of the Invention

The present invention generally relates to the field of optical communication and, more particularly to optical sampling.

2. Description of the Related Art

The monitoring of an optical channel quality is a challenging issue in all-optical networks, for which cost-effective, bit-rate and data-format flexible all-optical monitoring methods are needed to replace electronics-based methods. Given the limitations of the response speed of existing photodetectors, all-optical sampling is a promising enabling technology for optical networks with, for example, a data rate exceeding 40 Gb/s.

Sampling methods typically derive the time resolution needed to monitor the data waveforms from short temporal sampling gates. Such methods can be categorized by how the sampling gates are implemented. There are essentially three physical processes underpinning existing optical sampling techniques: nonlinear optical wave mixing between the short sampling pulses and data pulses, short optical gates from nonlinear optical interferometric switches, and linear optical homodyne detection of data using ultrashort optical pulses.

Current all-optical sampling methods are capable of measuring the eyes of optical data of a bit rate as high as 640-Gb/s, however, such methods are costly, complex, and relatively difficult to implement. The current methods are better suited as test and measurement tools in a laboratory environment rather than in actual networks. Specifically, these schemes typically require complex optical sources generating picosecond sampling pulses. The physical processes are inherently polarization and wavelength sensitive and can pose great difficulty in implementing all-optical sampling for actual networks, where the polarization of the data pulses can fluctuate rapidly, even from bit to bit, and different optical channels have different wavelengths in a WDM system. The typical remedies to combat these deficiencies, such as polarization-diversity schemes for the varying polarization of the data, tend to be complicated and costly. Additionally, a clock recovery circuit is necessary for synchronous sampling, where the repetition rate of the sampling gates is synchronized with the data, and it also increases the complexity and cost of the implementation.

Although electroabsorption modulators (EAMs) are attractive devices for generating short temporal gates, owing to the nonlinear optical-transmission as a function of the drive voltage, optical sampling using only one EAM poses several difficulties. These difficulties include, for example, the fact that the direct generation of picosecond electrical pulses of variable repetition rates less than about 100 MHz (the suitable rates for low-cost data acquisition and processing electronics) typically induces temporal jitters larger than several picoseconds, compromising the time resolution of the sampling. Other difficulties include the high cost of the wide bandwidth electronics required in the pulse generation process and pulse amplification to drive an EAM. Also, the extinction ratio of the temporal gates from an EAM tends to get worse when generating gates having shorter durations.

SUMMARY OF THE INVENTION

These and other deficiencies of the prior art are addressed by embodiments of the present invention that include a method and apparatus which employ EAMs for optical sampling and simultaneous clock recovery.

In accordance with specific embodiments of the present invention, optical sampling gates are generated by one or more EAMs driven by a sinusoidal RF voltage, a train of electrical pulses, or combination thereof, without the need for an optical sampling source. Prescaled clock recovery from the optical data can be simultaneously implemented using, for example, an EAM as a phase detector coupled to a phase-locked loop (PLL) clock recovery circuit. The optical data that pass through the EAM-generated gates are preferably sampled by a photodetector and an analog-to-digital converter (ADC).

In one embodiment, an optical sampling method is provided which includes modulating an optical signal using at least one first electroabsorption modulator (EAM) driven by at least one sinusoidal RF voltage signal to provide substantially jitter free temporal gating of the optical signal. The gated optical signal from the at least one first EAM is routed through at least one second EAM to provide an optical output signal having a reduced repetition rate. The second EAM is driven using an electrical pulse train having a repetition rate that is a subharmonic of the frequency of the sinusoidal RF voltage signal driving the first EAM.

In another embodiment, an optical sampling apparatus is provided which includes at least one first electroabsorption modulator (EAM) for modulating an optical signal to provide a gated optical signal. At least one second EAM optically coupled to the at least one first EAM is provided for receiving the gated optical signal from the first EAM and for providing an optical output signal having a reduced repetition rate. Drive circuitry is also provided to drive the first and second EAMs.

BRIEF DESCRIPTION OF THE DRAWINGS

The foregoing and other objects, features and advantages of the present invention will become more apparent from the following detailed description when taken in conjunction with the appended drawings.

It is to be noted, however, that the appended drawings illustrate only exemplary embodiments of the invention and are therefore not to be considered limiting of the scope of the invention.

FIGS. 1A–D graphically depict short optical gate generation using electroabsorption modulators, in which:

FIG. 1A is a graph showing the optical transmission of an EAM plotted against a bias voltage;

FIG. 1B is a graph showing a superposition of 20-GHz and 40-GHz sinusoidal microwaves applied to the EAM;

FIG. 1C is a graph depicting the optical gates generated by a first EAM as a result of the modulation shown in FIG. 1B (solid curve) and the optical gate generated by a second EAM driven by an electrical pulse train (dashed curve);

FIG. 1D is a graph, in linear scale, of a low repetition-rate gate;

DETAILED DESCRIPTION

The method and apparatus for optical sampling of the present invention beneficially employs the short optical gate generation using electroabsorption modulators (EAMs). The time resolution $\Delta t$ of a sampling system is determined by the convolution of the sampling gate duration and the timing jitter of the gates. The optical bandwidth of a sampling apparatus can be estimated to be about $0.44/\Delta t$. The optical gating provided by the EAMs preferably satisfies the following requirements regarding the time resolution and repetition rate for optical sampling at a data rate up to about 160 Gb/s: 1) the optical bandwidth of the sampling needs to be preferably wider than about 75% of the bandwidth of the optical data, and 2) the repetition rate of the optical gates is preferably slow enough (e.g. on the order of about 10–100 MHz) to allow the use of cost effective, low-speed photodetectors and data acquisition electronics, such as an analog-to-digital converter (ADC).

The gating requirements are preferably achieved using EAMs. The optical transmission of an EAM is a highly nonlinear function of the applied bias voltage. As result, the duration of the optical gates from an EAM can be made significantly shorter than the shortest time scale of an electrical drive voltage.

A graphic depiction of the principle of short optical gate generation in accordance with aspects of the present invention is shown in FIGS. 1A–D. It can be understood by those skilled in the art that the bandwidth of the electrooptic response of EAMs used to practice the invention is preferably sufficiently wide enough for the driving electrical waveforms. It is appreciated, however, that the finite bandwidth of an EAM may limit the time resolution of the sampling gates. Shorter temporal gates can be achieved by using a higher frequency sinusoidal drive (within any bandwidth limitation of the EAMs).

Figure 2A:
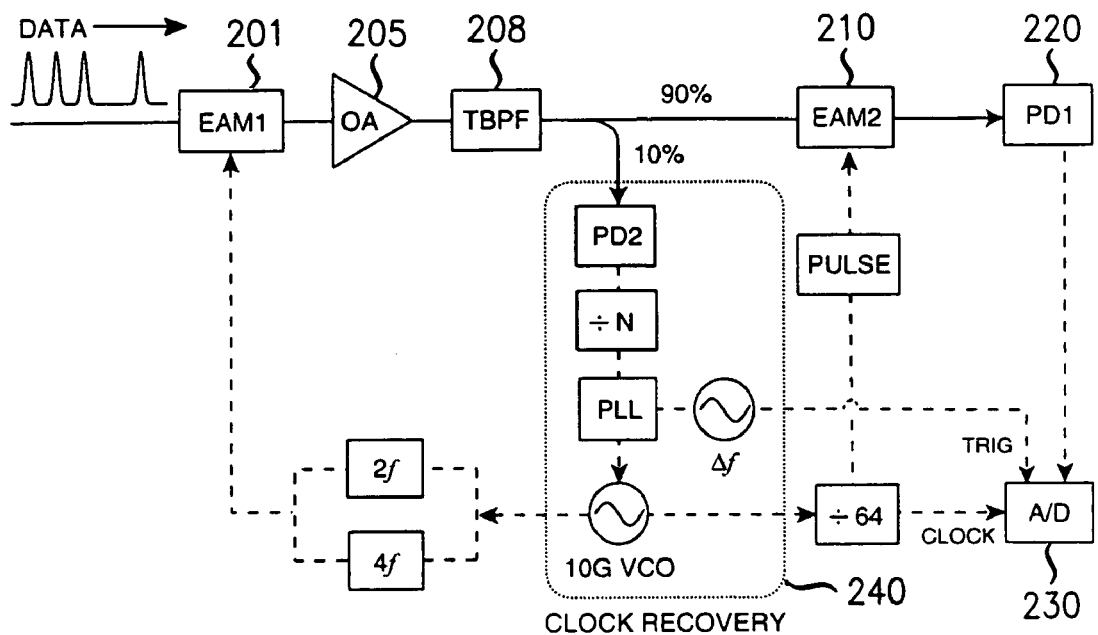
FIG. 2A is a block diagram showing one embodiment of an optical sampling apparatus in accordance with one or more aspects of the present invention.

An exemplary embodiment of an optical sampling apparatus 200 in accordance with the present invention, is shown in FIG. 2A. Solid lines are used to show optical connections, and dashed lines are used to show electrical connections (OA—optical amplifier; TBPF—tunable band-pass filter; PD—photodetector; A/D—Analog-to-Digital converter).

Figure 1:
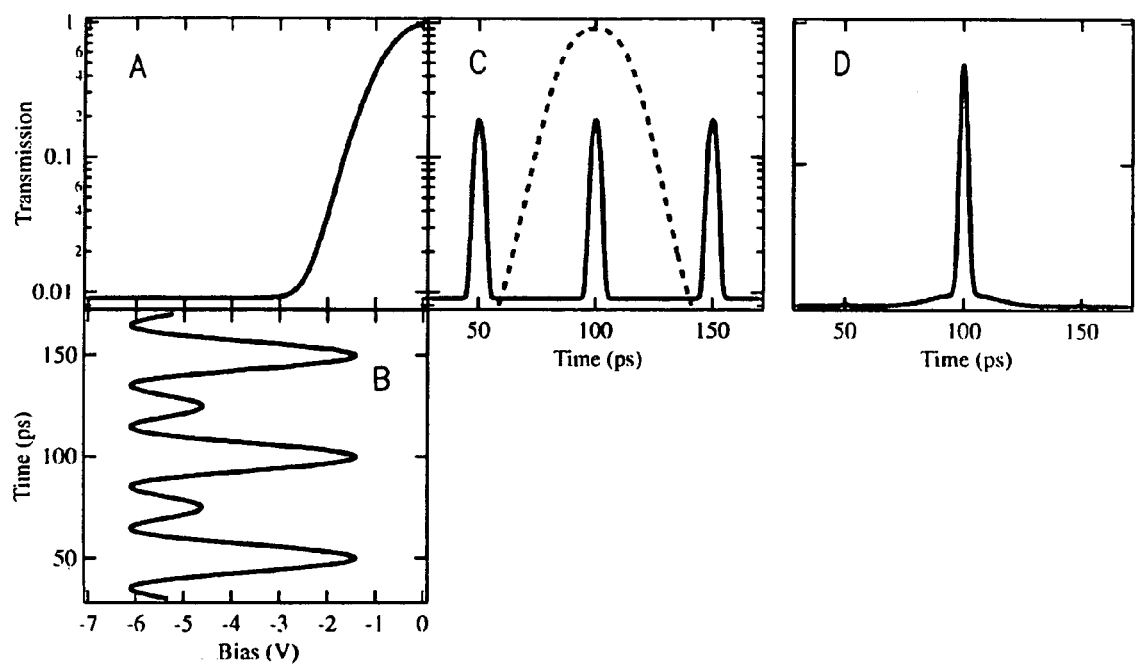

As can be understood from FIG. 2A and the following discussion, a first EAM (EAM1) 201 is driven to produce "gates" for temporally gating an optical data signal. Preferably, EAM1 201 is driven using at least one sinusoidal RF voltage signal. More specifically, EAM1 201 is preferably driven with a superposition of 20-GHz and 40-GHz sinusoids to provide gates of about 4.6-ps and a repetition rate of about 20-GHz (as illustrated in FIG. 1).

The gated optical signal may optionally be amplified using an optical amplifier 205 to compensate for any insertion loss from EAM1 201.

The gated (and amplified) optical signal may then optionally be routed through a TBPF 208 to reduce any noise added to the optical signal by the amplifier 205.

The gated optical signal is then preferably gated by a second EAM (EAM2) 210 to reduce the repetition rate of the optical signal gated by EAM1 201. Preferably, EAM2 210 is driven using an electrical pulse train having a repetition rate that is a subharmonic of the frequency of the sinusoidal RF voltage signal driving EAM1 201. More specifically, EAM2 is preferably driven using electrical pulses of about 50-ps duration running at about 156 MHz (10 GHz/64). Routing the gated optical signal from EAM1 201 through EAM2 210 provides an optical output signal having a reduced repetition rate. The reduced repetition rate provided by such a configuration allows the use of low-speed (and accordingly lower cost) photodetector(s) and data acquisition electronics.

An InGaAs PIN photoreceiver (PD1) 220 (e.g. about 700-MHz) and an ADC (e.g. a Gage Compuscope 82G) 230 with an analog bandwidth of about 400-MHz are preferably used to sample the output of the EAM2 210. The signal detected by the photoreceiver 220 is preferably sampled by the ADC 230 at a rate that is synchronous to the rate at which EAM2 is modulated (e.g. at about 156 Mega samples/s). A high-pass filter (not shown) with a cut off frequency of about 50 kHz before the ADC may be used to block slowly varying components that result from a finite extinction ratio (e.g. 20 dB) of the EAM2 220.

Commercially available C-band EAMs (e.g. OKI-OM5642W-30B manufactured by OKI Electric, Inc. with, for example, a 3-dB electrooptic bandwidth of 30 GHz may be used for the temporal gating in accordance with some embodiments of the present invention.

The relative amplitude of the 20-GHz and 40-GHz sinusoids which can be used to drive EAM1 201, is preferably optimized to yield substantially the shortest gate, while limiting the repetition rate to about 20 GHz. It is understood that this relaxes the requirement on the duration of the electrical pulses (e.g. 50 ps as opposed to 25 ps) that modulate EAM2 220.

It can be understood by those skilled in the art that the apparatus described above with reference to FIG. 2 is substantially insensitive to input data polarization and also to the data wavelength within the operation range of the EAMs (e.g. about 40 nm). Additionally, it is highly sensitive, requiring only about 1-mW peak signal power for eye quality monitoring.

Figure 2B:
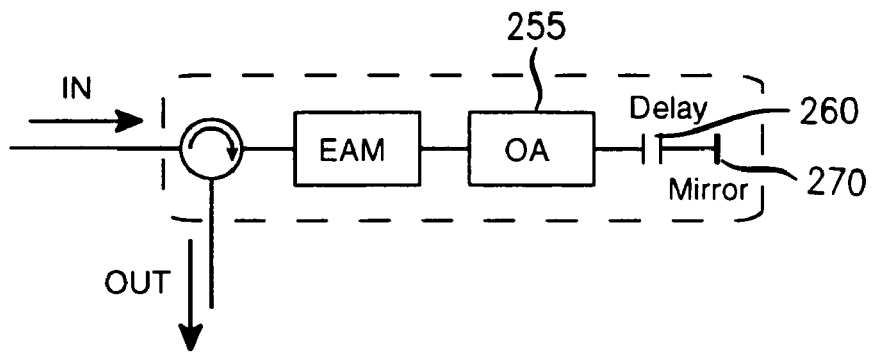
FIG. 2B schematically depicts a double-pass embodiment of an EAM device that may be used in accordance with the present invention.

In another embodiment, the width of the temporal gate experienced by the optical data signal may be reduced (e.g. to about 3.2 ps) by passing the optical signal through another EAM (or EAM1 201 twice), in a double-pass configuration. An optical amplifier 255, a delay device 260 and a mirror device 270, as shown in FIG. 2B, may be used in such a configuration. The optical amplifier 255 is preferably a bi-directional optical amplifier capable of compensating for some or all of the insertion losses experienced by the optical signal due to the EAMs. The temporal delay provided by the delay device 260 is preferably adjusted for substantially maximum transmission.

It can be understood by those skilled in the art that a plurality of EAMs may be used to provide the function of EAM2 210. For example, the optical output of EAM2 210 may be routed to another EAM driven by an electrical pulse train substantially identical to that driving EAM2 210 to increase the extinction ratio. Alternatively, the optical output of EAM2 210 may be rerouted to pass through EAM2 210 twice using an arrangement that is substantially similar to that shown in FIG. 2B.

The embodiments discussed above with reference to FIGS. 1 and 2 allow for the integration of a clock recovery circuit, such as the preferred EAM-based PLL clock recovery circuit 240 shown in FIG. 2A. As shown in FIG. 2A, about ten percent (10%) of the gated/amplified output of EAM1 201 can be routed to the clock recovery circuitry 240, and the cross-correlation between the optical data and the gate can be detected using a 10-MHz bandwidth photoreceiver (PD2). For prescaled timing extraction purposes, the cross correlation can be divided by a counter depending on the ratio between the data rate and the gating rate (e.g. 20 GHz).

To facilitate the temporal scanning of the gate with respect to the data stream, the recovered clock frequency of the voltage-controlled oscillator (VCO) is preferably set to be slightly offset ($\Delta f \sim 100$ kHz) from the 10 G base line rate of the input OTDM data. This can be achieved by phase-locking the cross-correlation with the offset frequency $2\Delta f$ using a PLL chip. The output of the PLL circuit is preferably used to control the 10-GHz VCO frequency, closing the control loop. The 20 G and 40 G sinusoidal drives used to drive EAM1 201, as discussed above, can be derived from the VCO via frequency multiplication.

The performance of the present invention was experimentally validated using optical data signals having various data rates (e.g. 10, 40, 160 Gb/s). The data pulses were obtained from an actively mode-locked fiber laser producing 2.4-ps pulses at f=10 GHz. The output of the laser was encoded with 10-Gb/s PRBS data ($2^{17}-1$) using a lithium niobate modulator (not shown). The data-encoded pulses were then time-division multiplexed in cascaded polarization maintaining (PM) fiber delay lines (not shown), doubling the bit-rate at each stage.

Figures 3A, 3B:
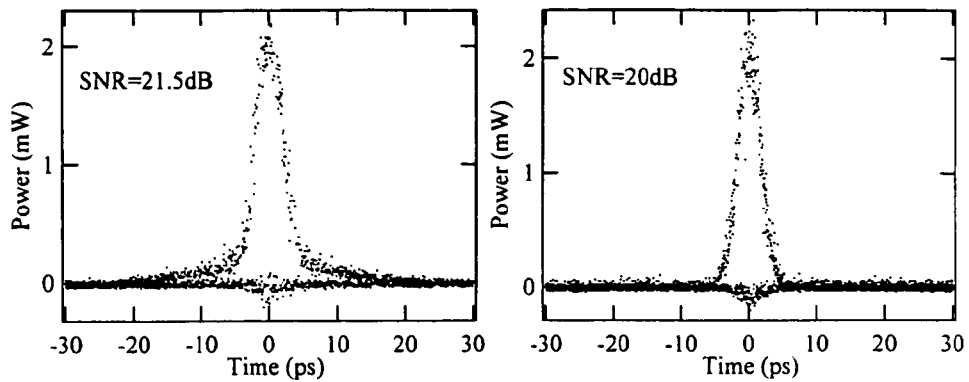
FIGS. 3A–B are optical eye diagrams of 10-Gb/s data obtained using the embodiments of the invention shown in FIGS. 2A and 2B, respectively.

The eye diagrams of optically sampled 10 Gb/s signals taken using a single and a double pass configuration (as discussed with regard to FIGS. 2A and 2B) are shown in FIGS. 3A–B. The eye shape is a convolution of the data pulse (2.4 ps) and the EAM gate generated by EAM1 and EAM2. For the single-pass case, the FWHM of the eyes is about 5.2 ps and the deconvolved width of the gate is about 4.6 ps. The deconvolved gate width for the double-pass case is about 3.2 ps.

As can be understood by those skilled in the art, the sensitivity of the optical sampling depends, at least in part, on the type of detector used for PD1 220. The data shown in FIGS. 3A–B are taken with a 700-MHz InGaAs PIN diode with an EDFA preamplifier in front. The noise generated in these embodiments is dominated by the ASE of the preamplifier. The signal-to-noise ratio, as measured by the ratio between the sampled eye height and the noise in the zero rail, is better than 20 dB for peak input power larger than about 1 mW for the single-pass setup and about 2 mW for the double-pass setup.

Without an optical preamplifier, the sensitivity may be reduced by 11 dB. Better or comparable sensitivity (~20 dB for 1-mW peak input power) may be achieved with an InGaAs avalanche photodiode instead of the PIN photodiode and optical preamplifier.

Figures 4A, 4B:
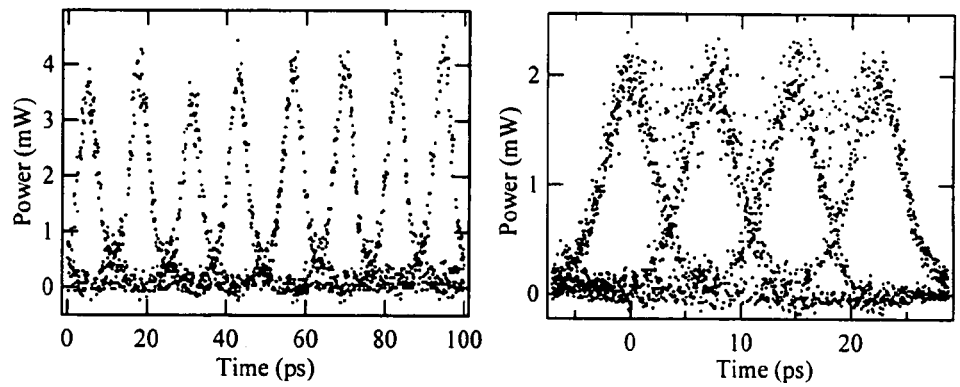
FIGS. 4A–B are eye diagrams of 80-Gb/s data and pseudo-140-Gb/s data, respectively, measured using the embodiment shown in FIG. 2A.

The optical bandwidth in the single-pass configuration was 100 GHz and sufficient for the eye monitoring of data with a bit rate up to 140 Gb/s. The eye diagram of 80-Gb/s data measured with simultaneous clock recovery is shown in FIG. 4A. The temporal jitter estimated from the phase noise in the RF spectrum of the recovered clock was about 240 fs.

Figures 5A, 5B:
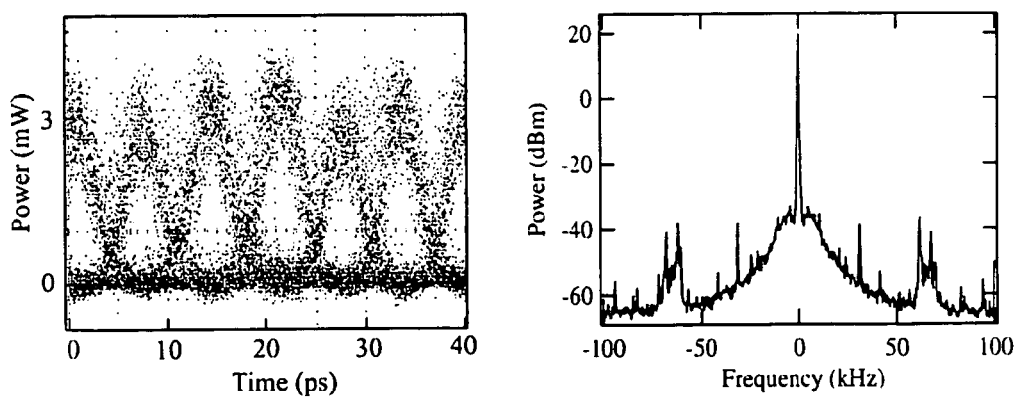
FIGS. 5A–B depict an eye diagram of 160-Gb/s data and an RF spectrum of a recovered 10G clock using the embodiments shown in FIGS. 2A and 2B.
Figure 6A:
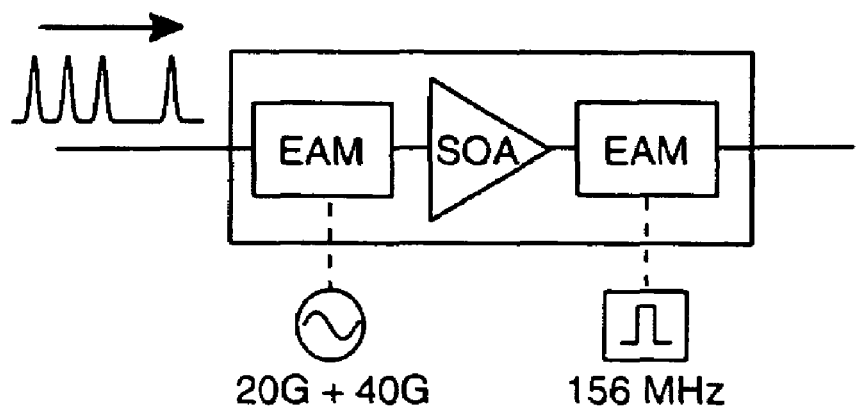
FIGS. 6A–B are block diagrams showing single-chip implementations of single-pass and double-pass embodiments, respectively, in accordance with the present invention.
Figure 6B:
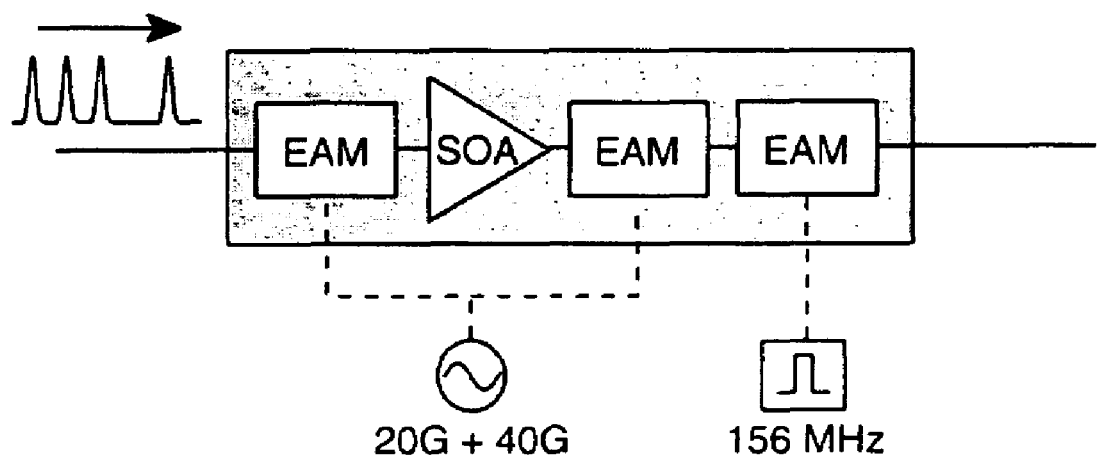

The eye diagram for pseudo-140-Gb/s data in FIG. 5B was obtained without the clock recovery since the data rate is not a 2" multiple of 10 GHz. The 10-GHz clock driving the OTDM data source was used for sampling instead. A voltage controlled phase shifter was used to scan the sampling gate. As can be understood from FIG. 4B, the quality of the eyes can be clearly evaluated even at 140 Gb/s.

The optical bandwidth of the sampling increased to about 143 GHz in the double-pass configuration. The eye-diagram of 160-Gb/s data was measured in the double-pass configuration and is shown in FIG. 5A. The eye diagram is displayed with a one-second persistence. The power spectrum of the recovered RF clock at 10 GHz is also plotted (resolution bandwidth of 300 Hz) in FIG. 5B. The estimated temporal jitter is 360 fs.

Although the present invention has been described with regard to preferred embodiments, some of which employ commercially available components, it is understood that the scope of the invention, as defined by the appended claims, is not limited to the specific embodiments discussed herein. Numerous modifications and improvements may be made to the embodiments discussed herein, including but not limited to, an integrated devices, such as those shown in FIGS. 7A–B. As can be understood from FIG. 7A the single-pass configuration of FIG. 2A can be integrated onto a single chip device using a semiconductor optical amplifier (SOA) functioning as the OA 205 in FIG. 2A. The single chip device is more compact and can potentially have at least about 10 dB less insertion loss as compared to the embodiment shown in FIG. 2A and proportionally higher sensitivity. The double-pass configuration in FIG. 2B can be adapted in a single chip device, as shown in FIG. 7B. Since the majority of the insertion loss of a semiconductor photonic device stems from the mode mismatch between the glass optical fiber and the semiconductor waveguide, the addition of one more element in an integrated device does not incur significant additional insertion loss. Additionally, the electronic drive voltages of EAMs can be modified depending on the bit rate of the optical signal or the bandwidth of the ADC. The apparatus shown in FIGS. 2A–B are designed to work for data rate of up to about 160 Gb/s using 400 MHz ADC. If, for example, sampling of 80-Gb/s data is needed, EAM1 can be driven with a 20-GHz sinusoid only. The repetition rate of EAM2 gating pulses can also be adjusted according to the bandwidth of the ADC. For data rates higher than 160 Gb/s, it may be necessary to use EAMs with a wider bandwidth than 30 GHz and use higher frequency RF drives.

We claim:

1. An optical sampling method, comprising the steps of:
   modulating an optical signal using at least one first electroabsorption modulator (EAM) driven using at least one sinusoidal RF voltage signal to provide substantially jitter free temporal gating of the optical signal; and
   routing a gated optical signal from the at least one first EAM through at least one second EAM to provide an optical output signal having a reduced repetition rate, the second EAM being driven using an electrical pulse train having a repetition rate that is a subharmonic of the frequency of the sinusoidal RF voltage signal driving the first EAM.

2. The method of claim 1, further comprising converting the optical output signal from the second EAM to an electronic signal using at least one photodetector; and
   sampling the electronic signal from the at least one photodetector with at least one analog-to-digital converter.

3. The method of claim 1, further comprising routing the optical signal through the at least one first EAM more than once.

4. The method of claim 3, wherein routing the optical signal through the at least one first EAM more than once includes routing an output of the at least one EAM through an optical amplifier, a delay device, off a mirror device and through the at least one first EAM such that the optical signal is gated at least twice.

5. The method of claim 1 further comprising:
detecting the gated optical output of the at least one first EAM using at least one photodetector; and
processing the output of the at least one photodetector to generate a control signal for a voltage controlled oscillator, wherein the at least one sinusoidal RF voltage signal for driving the at least one first EAM is derived from the output of the voltage controlled oscillator.

6. An optical sampling apparatus comprising:
at least one first electroabsorption modulator (EAM) for modulating an optical signal to provide a gated optical signal;
at least one second EAM optically coupled to the at least one first EAM for receiving the gated optical signal from the at least one first EAM and providing an optical output signal having a reduced repetition rate; and
drive circuitry adapted to 1) drive the first EAM with at least one sinusoidal RF voltage signal to provide substantially jitter free temporal gating of the optical signal, and 2) drive the second EAM with an electrical pulse train having a repetition rate that is a subharmonic of the frequency of the sinusoidal RF voltage signal driving the first EAM.

7. The apparatus of claim 6 further comprising at least one photodetector optically coupled to the at least one second EAM for converting the optical output signal from the second EAM to an electronic signal; and
at least one analog-to-digital converter coupled to the at least one photodetector for sampling the electronic signal from the at least one photodetector.

8. The apparatus of claim 6 further comprising at least one photodetector optically coupled to the at least one first EAM for detecting the gated optical output of the at least one first EAM; and
a processor for processing the output of the at least one photodetector to generate a control signal for a voltage controlled oscillator, wherein the at least one sinusoidal RF voltage signal for driving the at least one first EAM is derived from the output of the voltage controlled oscillator.

9. The apparatus of claim 8, wherein two or more of the first EAM, the second EAM, and the at least one photodetector are integrated into a single chip device.

10. The apparatus of claim 6 further comprising means for routing the optical signal through the at least one first EAM more than once.

11. The apparatus of claim 6, further comprising a semiconductor optical amplifier optically coupled between the first EAM and the second EAM to compensate for insertion losses.

12. The apparatus of claim 6, further comprising a third EAM optically coupled between the first EAM and the second EAM, wherein the drive circuitry drives the first and third EAMs using the at least one sinusoidal RF voltage signal and drives the second EAM using an electrical pulse train having a repetition rate that is a subharmonic of the frequency of the sinusoidal RF voltage signals driving the first and third EAMs.

13. An optical sampling apparatus comprising:
a means for modulating an optical signal using at least one first electroabsorption modulator (EAM) driven using at least one sinusoidal RF voltage signal to provide substantially jitter free temporal gating of the optical signal; and
means for routing a gated optical signal from the at least one first EAM through at least one second EAM to provide an optical output signal having a reduced repetition rate, the second EAM being driven using an electrical pulse train having a repetition rate that is a subharmonic of the frequency of the sinusoidal RF voltage signal driving the first EAM.

* * * * *